United States Patent
Abts

(10) Patent No.: US 8,306,042 B1
(45) Date of Patent: Nov. 6, 2012

(54) CLASS-BASED DETERMINISTIC PACKET ROUTING

(75) Inventor: Dennis C. Abts, Eleva, WI (US)

(73) Assignee: Google Inc., Mountain View, CA (US)

( * ) Notice: Subject to any disclaimer, the term of this patent is extended or adjusted under 35 U.S.C. 154(b) by 669 days.

(21) Appl. No.: 12/487,832

(22) Filed: Jun. 19, 2009

(51) Int. Cl.
*H04L 12/28* (2006.01)
*G06F 13/00* (2006.01)

(52) U.S. Cl. ........ 370/401; 370/203; 370/265; 370/389; 370/392; 370/434; 455/69; 711/148; 711/150

(58) Field of Classification Search ........... 370/328–401
See application file for complete search history.

(56) References Cited

U.S. PATENT DOCUMENTS

| | | | | |
|---|---|---|---|---|
| 5,041,971 A * | 8/1991 | Carvey et al. | ................... | 712/14 |
| 5,559,970 A * | 9/1996 | Sharma | ................... | 710/317 |
| 5,574,849 A * | 11/1996 | Sonnier et al. | ................ | 714/12 |
| 5,675,579 A * | 10/1997 | Watson et al. | ................ | 370/248 |
| 5,675,807 A * | 10/1997 | Iswandhi et al. | ............. | 710/260 |
| 5,689,689 A * | 11/1997 | Meyers et al. | ................ | 713/375 |
| 5,751,932 A * | 5/1998 | Horst et al. | ...................... | 714/12 |
| 5,751,955 A * | 5/1998 | Sonnier et al. | ................. | 714/12 |
| 5,790,776 A * | 8/1998 | Sonnier et al. | ................. | 714/10 |
| 5,838,894 A * | 11/1998 | Horst | ................ | 714/11 |
| 5,867,501 A * | 2/1999 | Horst et al. | .................... | 370/474 |
| 5,914,953 A * | 6/1999 | Krause et al. | ................. | 370/392 |
| 5,964,835 A * | 10/1999 | Fowler et al. | ................. | 709/216 |
| 6,151,689 A * | 11/2000 | Garcia et al. | ................... | 714/49 |
| 6,157,967 A * | 12/2000 | Horst et al. | .................... | 710/19 |
| 6,233,702 B1 * | 5/2001 | Horst et al. | ..................... | 714/48 |
| 6,285,679 B1 * | 9/2001 | Dally et al. | ................... | 370/413 |
| 6,370,145 B1 * | 4/2002 | Dally et al. | ................... | 370/400 |
| 6,496,940 B1 * | 12/2002 | Horst et al. | ..................... | 714/4.3 |
| 6,563,831 B1 * | 5/2003 | Dally et al. | ................... | 370/401 |
| 6,654,381 B2 * | 11/2003 | Dally et al. | ................... | 370/412 |
| 6,751,698 B1 * | 6/2004 | Deneroff et al. | ............. | 710/317 |
| 6,785,779 B2 * | 8/2004 | Berg et al. | ..................... | 711/146 |
| 6,910,108 B2 * | 6/2005 | Downer et al. | ............... | 711/141 |
| 6,947,433 B2 * | 9/2005 | Carvey | ........................... | 370/401 |
| 6,973,544 B2 * | 12/2005 | Berg et al. | ..................... | 711/141 |

(Continued)

FOREIGN PATENT DOCUMENTS

CA 2306364 A1 * 10/2000

(Continued)

OTHER PUBLICATIONS

Wentzlaff et al., On-Chip Interconnection Architecture of the Tile Processor, IEEE Micro, Sep.-Oct. 2007, pp. 15-31.

(Continued)

*Primary Examiner* — Ayaz Sheikh
*Assistant Examiner* — Venkatesh Haliyur
(74) *Attorney, Agent, or Firm* — Lerner, David, Littenberg, Krumholz & Mentlik, LLP

(57) ABSTRACT

Aspects of the invention pertain to deterministic packet routing systems and methods in multiprocessor computing architectures. Packets are analyzed to determine whether they are memory request packets or memory reply packets. Depending upon the packet, it is routed through nodes in the multiprocessor computer architecture in either an XY or YX path. Request and reply packets are sent in opposing routes according to a deterministic routing scheme. Multiport routers are placed at nodes in the architecture to pass the packets, using independent request and response virtual channels to avoid deadlock conditions.

16 Claims, 13 Drawing Sheets

U.S. PATENT DOCUMENTS

| | | | | |
|---|---|---|---|---|
| 6,981,074 | B2 * | 12/2005 | Oner et al. | 710/32 |
| 6,988,170 | B2 * | 1/2006 | Barroso et al. | 711/141 |
| 7,039,058 | B2 * | 5/2006 | Carvey | 370/400 |
| 7,046,633 | B2 * | 5/2006 | Carvey | 370/238 |
| 7,051,180 | B2 * | 5/2006 | Downer et al. | 711/173 |
| 7,131,020 | B2 * | 10/2006 | Moll et al. | 713/375 |
| 7,187,679 | B2 * | 3/2007 | Dally et al. | 370/400 |
| 7,240,141 | B2 * | 7/2007 | Ning et al. | 710/309 |
| 7,243,172 | B2 * | 7/2007 | Oner et al. | 710/66 |
| 7,366,092 | B2 * | 4/2008 | Moll et al. | 370/218 |
| 7,406,086 | B2 * | 7/2008 | Deneroff et al. | 370/400 |
| 7,440,469 | B2 * | 10/2008 | Oner | 370/419 |
| 7,475,271 | B2 * | 1/2009 | Oner | 713/502 |
| 7,549,091 | B2 * | 6/2009 | Rowlands et al. | 714/45 |
| 7,584,316 | B2 * | 9/2009 | Oner | 710/263 |
| 7,646,230 | B2 * | 1/2010 | Parfitt | 327/265 |
| 7,752,281 | B2 * | 7/2010 | Rowlands | 709/217 |
| 7,881,321 | B2 * | 2/2011 | Deneroff et al. | 370/412 |
| 8,179,775 | B2 * | 5/2012 | Chen et al. | 370/203 |
| 2001/0038634 | A1 * | 11/2001 | Dally et al. | 370/412 |
| 2002/0044560 | A1 * | 4/2002 | Dally et al. | 370/401 |
| 2002/0048272 | A1 * | 4/2002 | Carvey | 370/400 |
| 2002/0049901 | A1 * | 4/2002 | Carvey | 713/153 |
| 2002/0051427 | A1 * | 5/2002 | Carvey | 370/254 |
| 2003/0118048 | A1 * | 6/2003 | Dally et al. | 370/466 |
| 2003/0131067 | A1 * | 7/2003 | Downer et al. | 709/213 |
| 2003/0131200 | A1 * | 7/2003 | Berg et al. | 711/141 |
| 2003/0131203 | A1 * | 7/2003 | Berg et al. | 711/146 |
| 2003/0131214 | A1 * | 7/2003 | Downer et al. | 712/13 |
| 2004/0160970 | A1 * | 8/2004 | Dally et al. | 370/412 |
| 2005/0053057 | A1 * | 3/2005 | Deneroff et al. | 370/360 |
| 2005/0078601 | A1 * | 4/2005 | Moll et al. | 370/218 |
| 2005/0078669 | A1 * | 4/2005 | Oner | 370/389 |
| 2005/0078694 | A1 * | 4/2005 | Oner | 370/412 |
| 2005/0078696 | A1 * | 4/2005 | Oner | 370/419 |
| 2005/0080941 | A1 * | 4/2005 | Moll et al. | 710/15 |
| 2005/0080948 | A1 * | 4/2005 | Rowlands | 710/36 |
| 2005/0080952 | A1 * | 4/2005 | Oner et al. | 710/52 |
| 2005/0080953 | A1 * | 4/2005 | Oner et al. | 710/52 |
| 2005/0081127 | A1 * | 4/2005 | Rowlands et al. | 714/56 |
| 2005/0228930 | A1 * | 10/2005 | Ning et al. | 710/306 |
| 2007/0140240 | A1 * | 6/2007 | Dally et al. | 370/389 |
| 2008/0108310 | A1 * | 5/2008 | Tong et al. | 455/69 |
| 2008/0151909 | A1 | 6/2008 | Scott et al. | |
| 2008/0198867 | A1 * | 8/2008 | Moll et al. | 370/419 |
| 2009/0024833 | A1 * | 1/2009 | Deneroff et al. | 712/29 |

FOREIGN PATENT DOCUMENTS

FR    2905047 A1 *   2/2008

OTHER PUBLICATIONS

Bjerregaard et al., A Survey of Research and Practices of Network-on-Chip, ACM Computing Surveys, vol. 38, Mar. 2006, pp. 1-51.

Dally et al., Deadlock-Free Adaptive Routing in Multicomputer Networks Using Virtual Channels, IEEE Transactions And Distributed Systems, vol. 4, No. 4, Apr. 1993, p. 466-475.

Dally, Virtual Channel Flow Control, IEEE, 1990, pp. 60-68.

Dally, Virtual-Channel Flow Control, IEEE Transactions on Parallel and Distributed Systems, vol. 3, No. 2, Mar. 1992, pp. 194-205.

Jayasimha D.N. et al., A Foundation for Designing Deadlock-Free Routing Algorithms in Wormhole Networks, Journal of the ACM, vol. 50, No. 2, Mar. 2003, pp. 250-275.

Mohapatra, Wormhole Routing Techniques for Directly Connected Multicomputer Systems, ACM Computing Surveys, vol. 30, No. 3, Sep. 1998, pp. 374-410.

Mukherjee et al., A Comparative Study of Arbitration Algorithms for the Alpha 21364 Pipelined Router, Oct. 2002, pp. 223-234.

Vangal et al., An 80 Tile 1.28TFLOPS Network-on-Chip in 65nm CMOS, 2007 IEEE International Solid-State Circuits Conference, ISSCC 2007/Session 5/Microprocessors/5.2, pp. 98-99, and p. 589.

Ramanathan et al., Survey of Commercial Parallel Machines, ACM Sigarch Computer Architecture News, vol. 21, Issue 3, Jun. 1993, pp. 13-33.

Seo et al., Near-Optimal Worst-case Throughput Routing for Two-Dimensional Mesh Networks, Proceedings of the 32nd International Symposium on Computer Architecture (ISCA '05), IEEE, 2005, 12 pages.

* cited by examiner

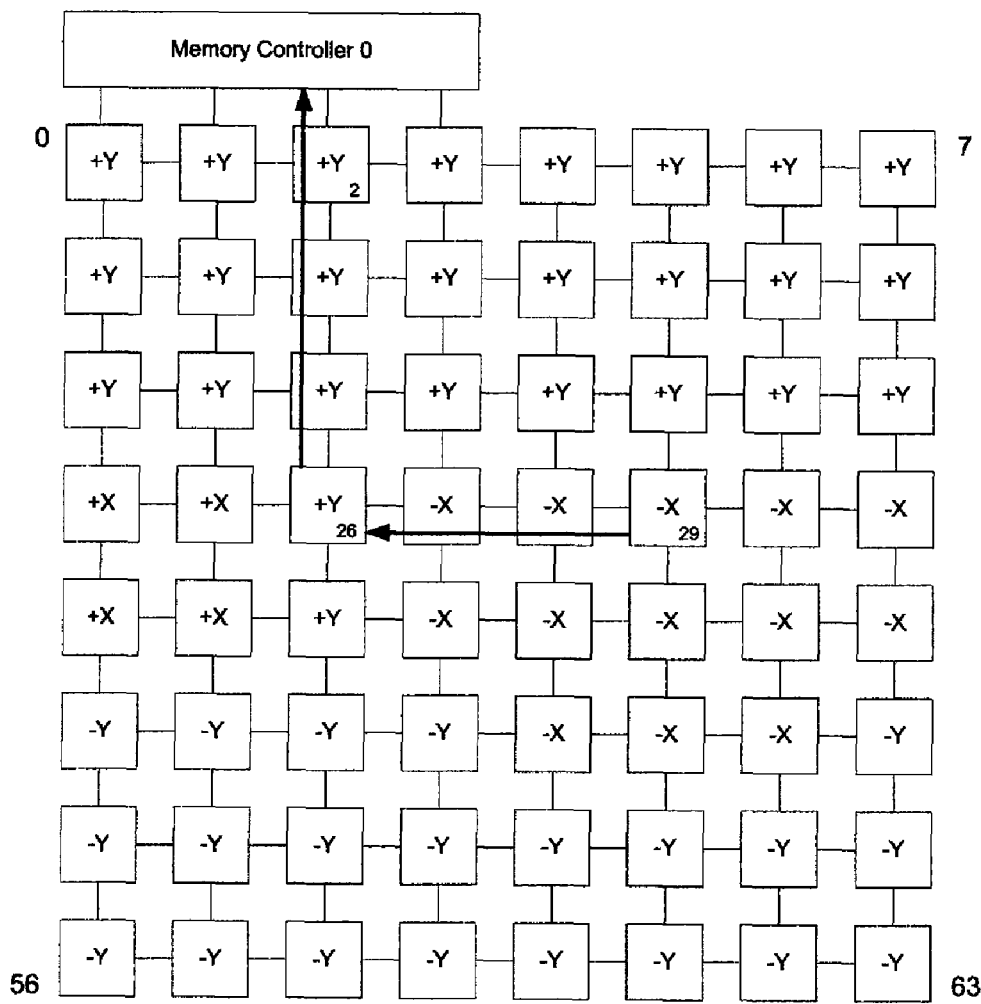

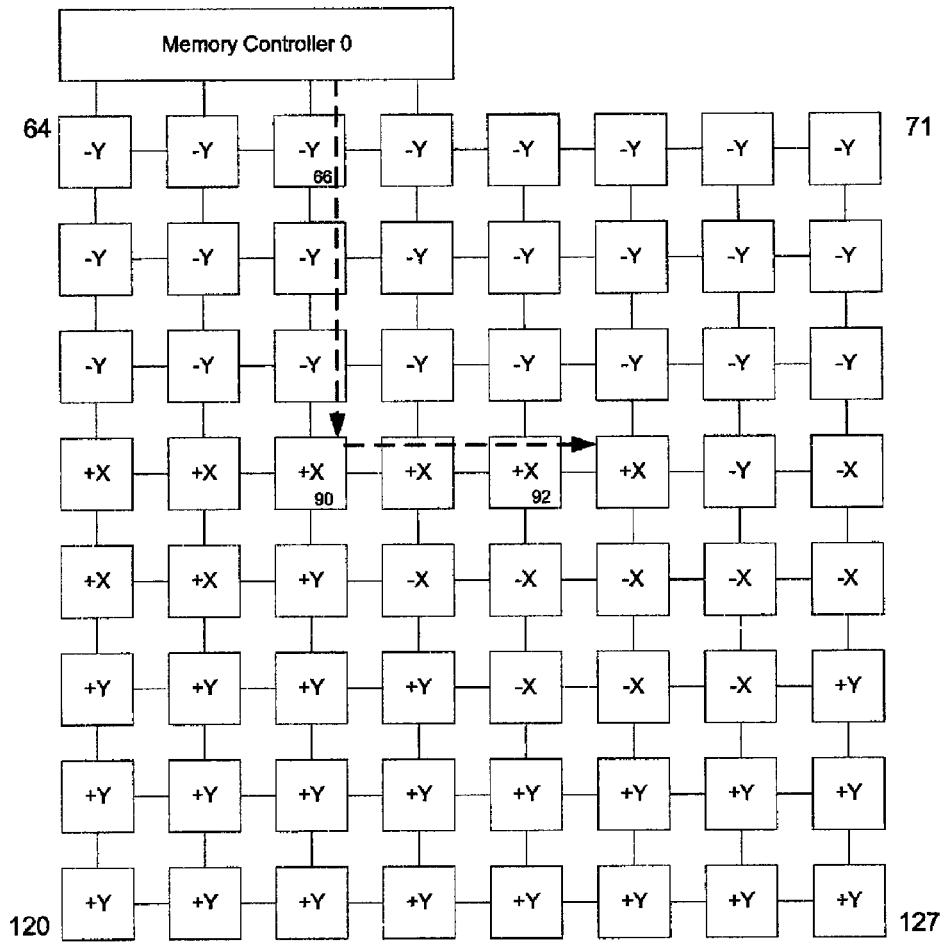

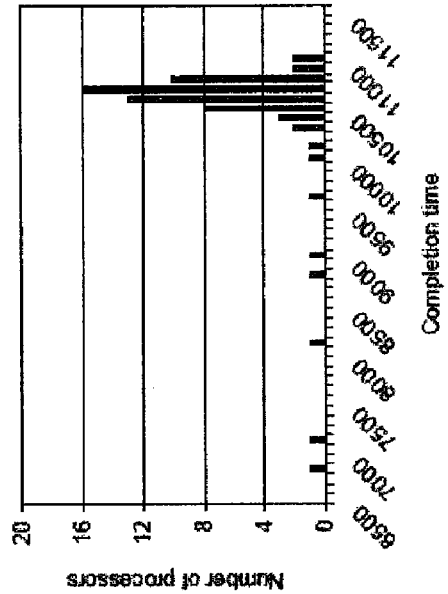
FIG. 8B  YX
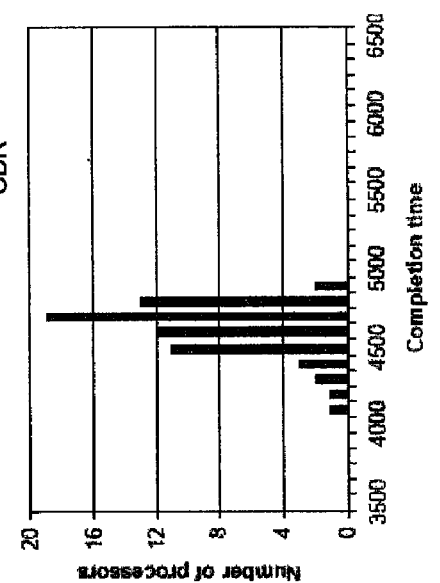
FIG. 8D  CDR
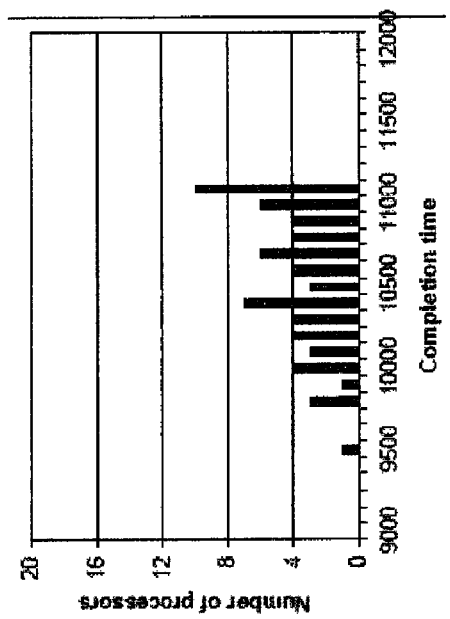
FIG. 8A  XY
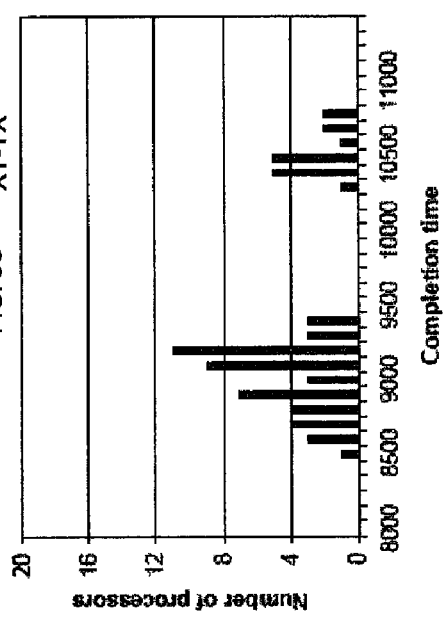
FIG. 8C  XY-YX

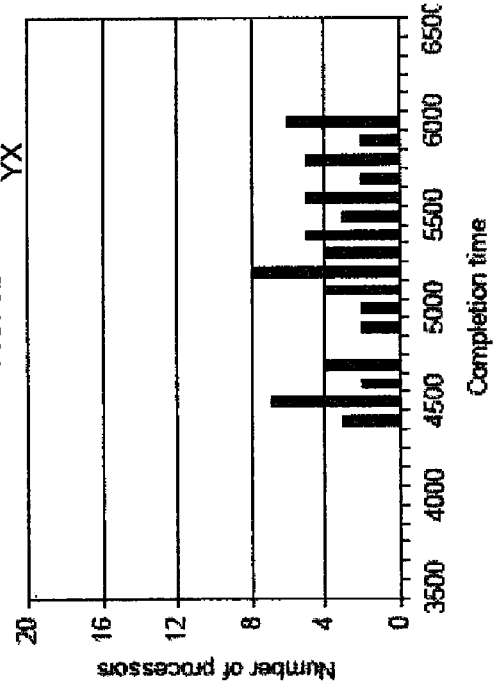
FIG. 9B  YX
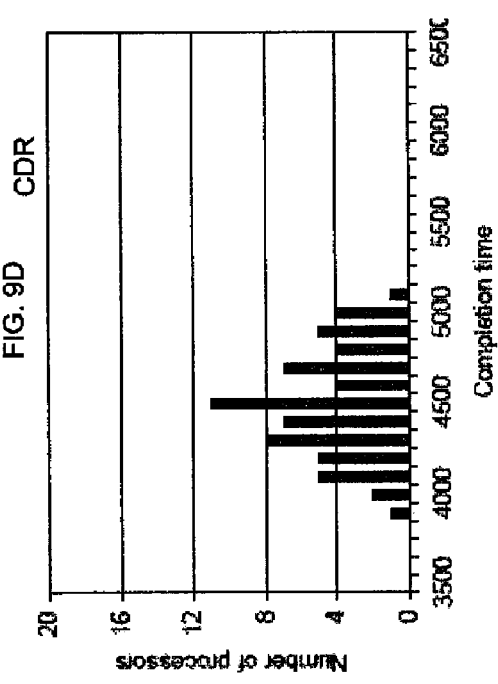
FIG. 9D  CDR
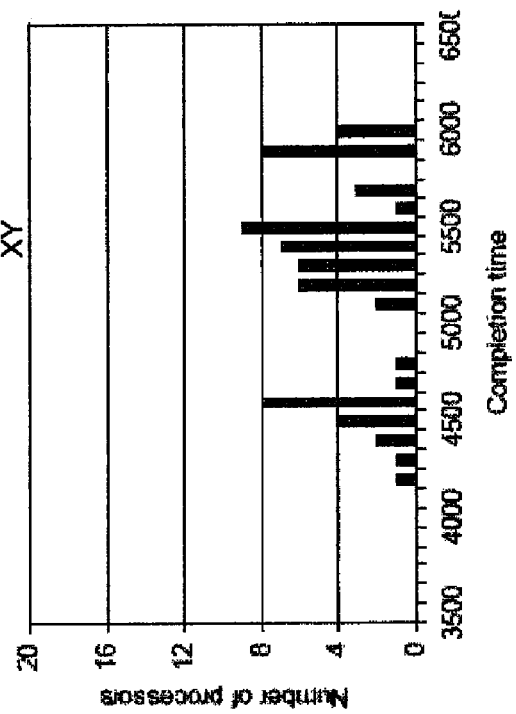
FIG. 9A  XY
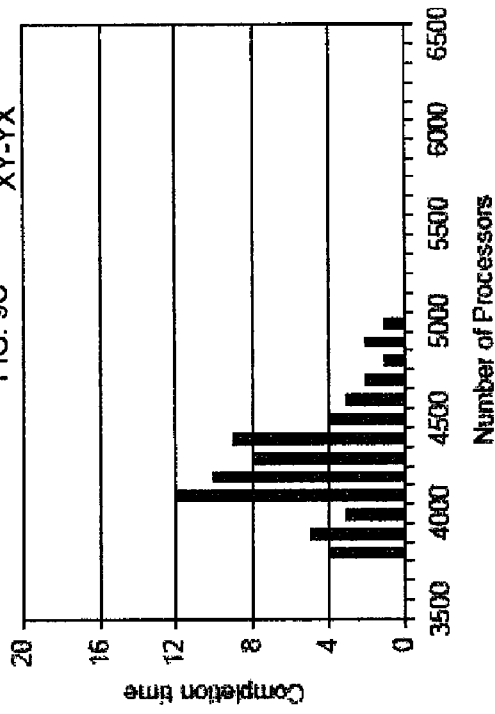
FIG. 9C  XY-YX

CLASS-BASED DETERMINISTIC PACKET ROUTING

BACKGROUND OF THE INVENTION

1. Field of the Invention

Aspects of the invention relate generally to multiprocessor computer architectures. More particularly, aspects are directed to routing data between processors and memory in such multiprocessor architectures.

2. Description of Related Art

In many computer systems, such as high speed data processing systems, multiple processors are employed. The processors may be arranged in different configurations. For instance, an array of processors may be configured in a mesh architecture. These processors may be interconnected and have access to external memory through one or more memory controllers.

Various routing schemes have been employed to pass data between processors and memory controllers. One issue that is particularly problematic is "deadlock." In a deadlock condition, data may be stalled during its transmission to or from a processor. Some schemes rely on virtual channels to overcome the deadlock issue.

Systems and methods which avoid deadlock conditions without increasing the number of virtual channels are provided.

SUMMARY OF THE INVENTION

In accordance with one embodiment, a multiprocessor architecture employing deterministic packet routing is provided. The architecture comprises a plurality of processors, a plurality of memory controllers and a plurality of router switches. The plurality of processors are arranged in an array. Each processor resides at a node of the array and is operable to route message packets across the array. Each memory controller is directly connected to at least one of the plurality of processors and to external memory. Each router switch is coupled to one of the nodes in the array and is operable to direct the message packets to an adjacent node in the array in a class-based deterministic packet routing process. Each router switch evaluates a received message packet to determine if it is a memory request packet or a memory reply packet. If the received message packet is a memory request packet issued from a source processor of the plurality of processors to a destination memory controller of the plurality of memory controllers, then the received memory packet is passed through selected nodes from the source processor to the destination memory controller via XY or YX routing. And if the received message packet is a memory reply packet issued from a source memory controller of the plurality of memory controllers to a destination processor of the plurality of processors, then the received memory packet is passed through the selected nodes from the source memory controller to the destination processor via YX or XY routing. If the memory request packet is passed through the selected nodes via XY routing then the memory reply packet is passed through the selected nodes via YX routing. And if the memory request packet is passed through the selected nodes via YX routing then the memory reply packet is passed through the selected nodes via XY routing.

In one example, the array comprises a mesh architecture. In another example, each router switch is a multi-port router switch having ports coupled to the adjacent nodes in the array and a port coupled to the processor residing at the same node in the array. In one alternative, each multi-port router switch includes buffering for storing the received memory packet, a routing mechanism for routing the received memory packet, and processing logic for determining which path to route the received memory packet along. In this case, the routing mechanism may include at least one pair of shared physical channels into and out of the multi-port router switch and a set of independent request and response virtual channels multiplexed between the at least one pair of shared physical channels to avoid deadlock.

In another example, each router switch includes a preset routing table for determining an output routing direction for the received memory packet. And in a further example, the preset routing table includes at least a first entry for the memory request packet and at least a second entry for the memory reply packet, wherein the second entry is distinct from the first entry.

In another embodiment, a method of performing deterministic packet routing in a multiprocessor architecture is provided. The method comprises obtaining one or more message packets at a node in a multiprocessor array; determining whether each message packet is a memory request packet or a memory reply packet; storing each memory request packet in a request input buffer and storing each memory reply packet in a reply input buffer; arbitrating between the stored memory request packets and memory reply packets to determine which virtual channel will be used to transmit selected packets to adjacent nodes in the multiprocessor array; analyzing a first one of the selected packets using preset routing information to determine which adjacent node in the multiprocessor array the first selected packet will be sent to; and transmitting the first selected packet to the determined adjacent node in the multiprocessor array.

In one example, analyzing the first selecting packet includes evaluating a route lookup table to determine the adjacent node. In an alternative, the route lookup table stores a first routing layout for memory request packets and a second routing layout for memory reply packets, the second layout being distinct from the first layout. In a first scenario, the first layout is an XY routing scheme and the second layout is a YX routing scheme. And in a second scenario the first layout is the YX routing scheme and the second layout is the XY routing scheme.

In another example, the first selected packet is transmitted via XY or YX routing according to its packet type so that if the first selected packet is a memory request packet it is passed via XY routing and if the first selected packet is a memory reply packet it is passed through the selected nodes via YX routing.

In a further example, the first selected packet is transmitted via XY or YX routing according to its packet type so that if the first selected packet is a memory request packet it is passed via YX routing and if the first selected packet is a memory reply packet it is passed through the selected nodes via XY routing.

Yet another embodiment provides a computer-readable recording medium recorded with a program executable by a processor. The program causes the processor to: obtain one or more message packets at a node in a multiprocessor array; determine whether each message packet is a memory request packet or a memory reply packet; store each memory request packet in a request input buffer and store each memory reply packet in a reply input buffer; arbitrate between the stored memory request packets and memory reply packets to determine which virtual channel will be used to transmit selected packets to adjacent nodes in the multiprocessor array; analyze a first one of the selected packets using preset routing information to determine which adjacent node in the multiprocessor array the first selected packet will be sent to; and transmit the first selected packet to the determined adjacent node in the multiprocessor array.

In one example, the program further causes the processor to execute operations associated with the first selected packet. In another example, the program further causes the processor to configure a routing mechanism having at least one pair of shared physical channels and a set of independent request and response virtual channels multiplexed between the at least one pair of shared physical channels to avoid deadlock.

In a further embodiment, a multiprocessor architecture employs deterministic packet routing and the architecture comprises a plurality of processors arranged in an array, each processor residing at a node of the array and operable to route message packets across the array; a plurality of memory controllers, each memory controller being directly connected to at least one of the plurality of processors and to external memory; a plurality of router switches, each router switch being coupled to one of the nodes in the array and operable to direct the message packets to an adjacent node in the array in a class-based deterministic packet routing process; wherein each router switch evaluates a received message packet to determine whether it is a memory request packet, and if the received message packet is a memory request packet issued from a source processor of the plurality of processors to a destination memory controller of the plurality of memory controllers, then the memory request packet is passed through selected nodes from the source processor to the destination memory controller using one of XY or YX routing.

In yet another embodiment, a multiprocessor architecture employs deterministic packet routing, and the architecture comprises a plurality of processors arranged in an array, each processor residing at a node of the array and operable to route message packets across the array; a plurality of memory controllers, each memory controller being directly connected to at least one of the plurality of processors and to external memory; a plurality of router switches, each router switch being coupled to one of the nodes in the array and operable to direct the message packets to an adjacent node in the array in a class-based deterministic packet routing process; wherein each router switch evaluates a received message packet to determine if it is a memory request packet or a memory reply packet, and if the received message packet is a memory reply packet issued from a source memory controller of the plurality of memory controllers to a destination processor of the plurality of processors, then the received memory reply packet is passed through the selected nodes from the source memory controller to the destination processor using one of YX or XY routing.

Another embodiment is directed to a method of performing deterministic packet routing in a multiprocessor architecture. The method comprises obtaining message packets at a node in a multiprocessor array, the message packets comprising memory request packets; storing each memory request packet in an input buffer; arbitrating between the stored packets to determine which virtual channel will be used to transmit selected packets to adjacent nodes in the multiprocessor array; analyzing a first one of the selected packets using preset routing information to determine which adjacent node in the multiprocessor array the first selected packet will be sent to; and transmitting the first selected packet to the determined adjacent node in the multiprocessor array.

And in a further embodiment, a method of performing deterministic packet routing in a multiprocessor architecture is provided. The method comprises obtaining message packets at a node in a multiprocessor array, the message packets comprising memory reply packets; storing each memory reply packet in an input buffer; arbitrating between the stored packets to determine which virtual channel will be used to transmit selected packets to adjacent nodes in the multiprocessor array; analyzing a first one of the selected packets using preset routing information to determine which adjacent node in the multiprocessor array the first selected packet will be sent to; and transmitting the first selected packet to the determined adjacent node in the multiprocessor array.

BRIEF DESCRIPTION OF THE DRAWINGS

FIGS. 4C-D illustrate examples of routing functions in accordance with aspects of the invention.

FIGS. 8A-D illustrate distribution plots for a first multiprocessor architecture in accordance with aspects of the invention.

FIGS. 9A-D illustrate distribution plots for a second multiprocessor architecture in accordance with aspects of the invention.

DETAILED DESCRIPTION

Aspects, features and advantages of the invention will be appreciated when considered with reference to the following description of preferred embodiments and accompanying figures. The same reference numbers in different drawings may identify the same or similar elements.

Furthermore, the following description is not limiting; the scope of the invention is defined by the appended claims and equivalents.

Figure 1:
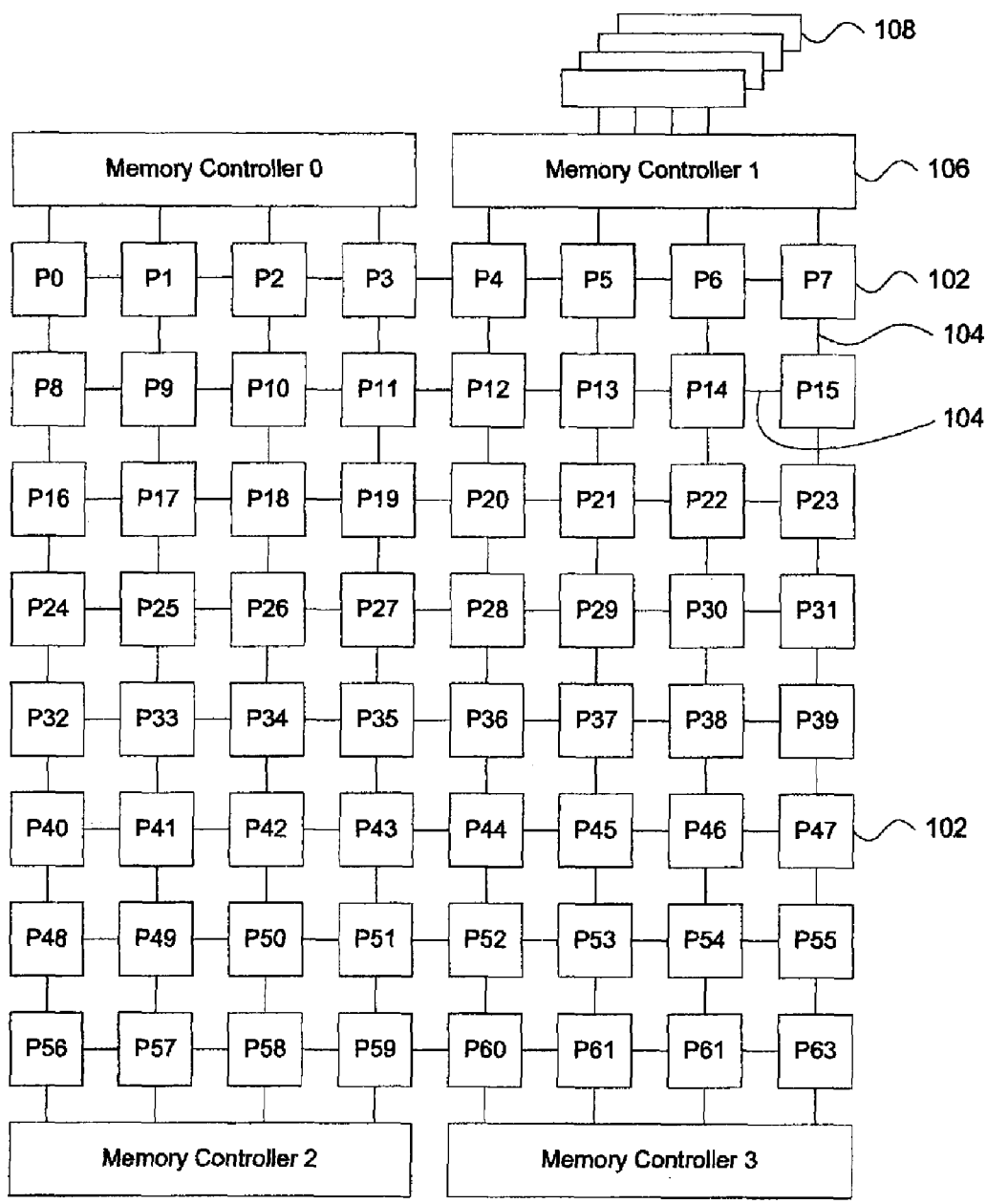
FIG. 1 illustrates a multiprocessor architecture for use in accordance with aspects of the invention.

FIG. 1 illustrates an exemplary multiprocessor computer architecture 100 for use with aspects of the invention. As shown, the architecture includes 64 processors (P0 . . . P63) arranged in a mesh-type configuration at nodes 102. The processors at adjacent nodes 102 in the mesh are directly linked to one another via connections 104. For instance, processor P9 is connected to processors P1, P8, P10 and P17.

The processors along the top (P0 . . . P7) and bottom (P56 . . . P63) nodes of the mesh may be directly linked to respective memory controllers 106. As shown in this example, four processors 102 connect to each memory controller 106. In addition, each memory controller 106 couples to a physical memory 108. The remaining processors may communicate with the memory controllers 106 through one or more intervening nodes 102.

Figure 2A:
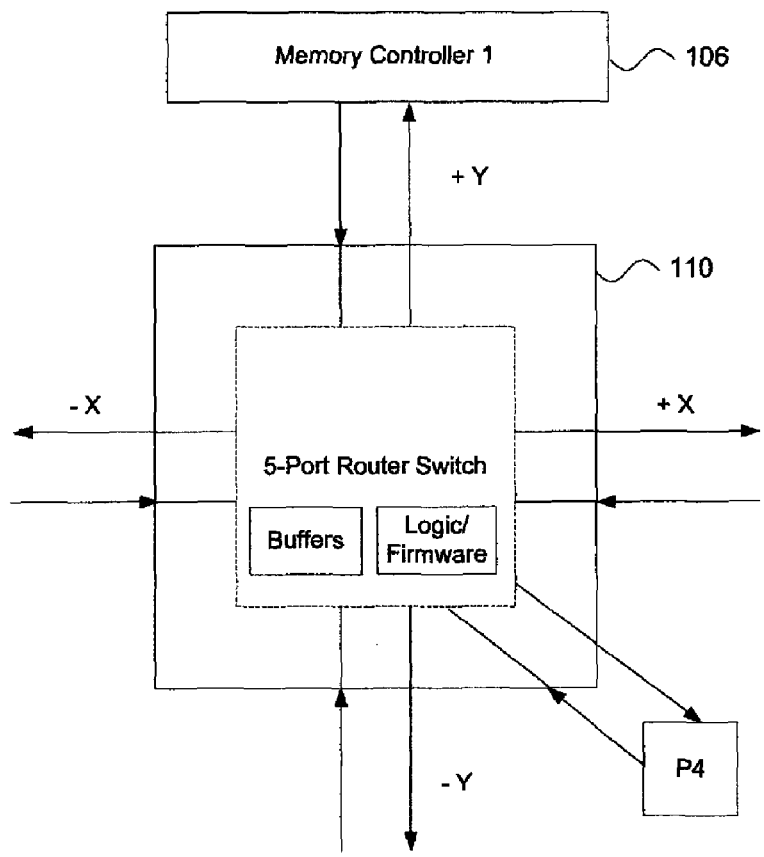
FIGS. 2A-B illustrate a router switch in accordance with aspects of the invention.

FIG. 2A illustrates that each node 102 may include a multi-port router switch 110. In the configuration shown, the multi-port router switch 110 is a five-port router switch. Four ports connect to adjacent nodes in the +X, −X, +Y and −Y directions of the mesh. The fifth port connects to the processor co-located at the switch's respective node. Thus, in this example the fifth port connects to processor P4, which is located along the top edge of the mesh. The −X direction port connects to processor P3, the +X direction port connects to processor P5 and the −Y direction port connects to processor P12. As processor P4 is located along a top edge of the mesh, the +Y direction port connects to a memory controller, namely memory controller 1.

Figure 2B:
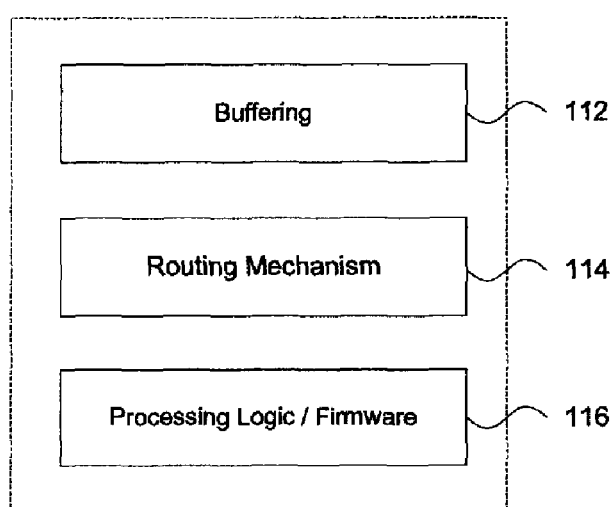

As shown in FIG. 2B, the multi-port router switch 110 includes buffering 112 and a routing mechanism 114 for routing data packets between the memory controllers and the processors. The router switch 110 also includes processing logic or firmware 116 for determining which path(s) to route packets along. This avoids undesirable situations such as routing deadlock.

Figure 3:
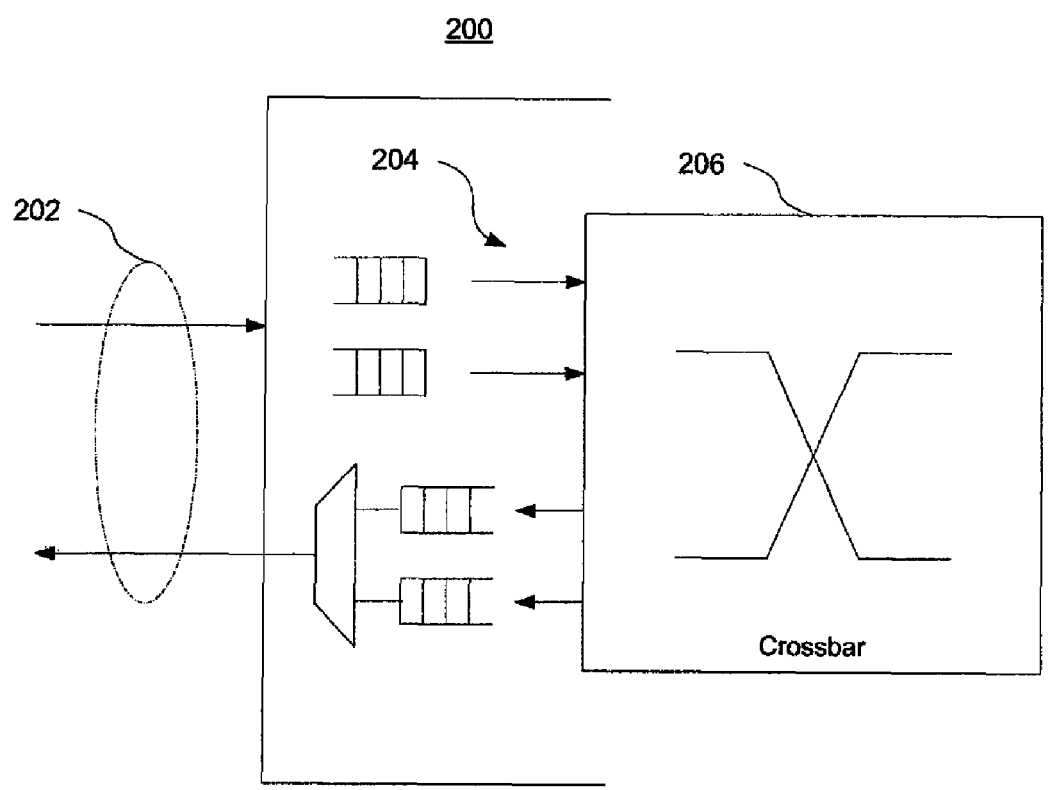
FIG. 3 illustrates a virtual channel implementation for use with aspects of the invention.

Routing deadlock occurs when one packet held in a router switch prevents other packets from being routed through that router switch. One solution is to pass data packets along virtual channels instead of along actual physical channels. FIG. 3 illustrates a virtual channel configuration 200 for the routing mechanism 114 of the router switch 110. As shown, there is at least one pair of shared physical channels 202 into and out of the switch. A set of independent request and response virtual channels 204 are multiplexed between the shared physical channels 202 and a crossbar architecture 206. The CDR architecture employs virtual channels to break deadlock routing. Those same channels can also be used to break protocol deadlock.

Virtual channels may used to break deadlock in several ways: 1) protocol deadlocks, e.g. a request-reply deadlock where a reply is blocked by a request which is in turn blocked by another reply, etc; 2) turn cycles which arise in a routing algorithms (i.e. routing deadlock). The process may make an "illegal" turn—one which may cause a potential cycle—by switching virtual channels to avoid the dependency; and 3) overlapping virtual channel dependencies around a torus where virtual channels are used to set a "dateline" and only when a packet crosses this dateline it switches virtual channels.

Figure 4A:
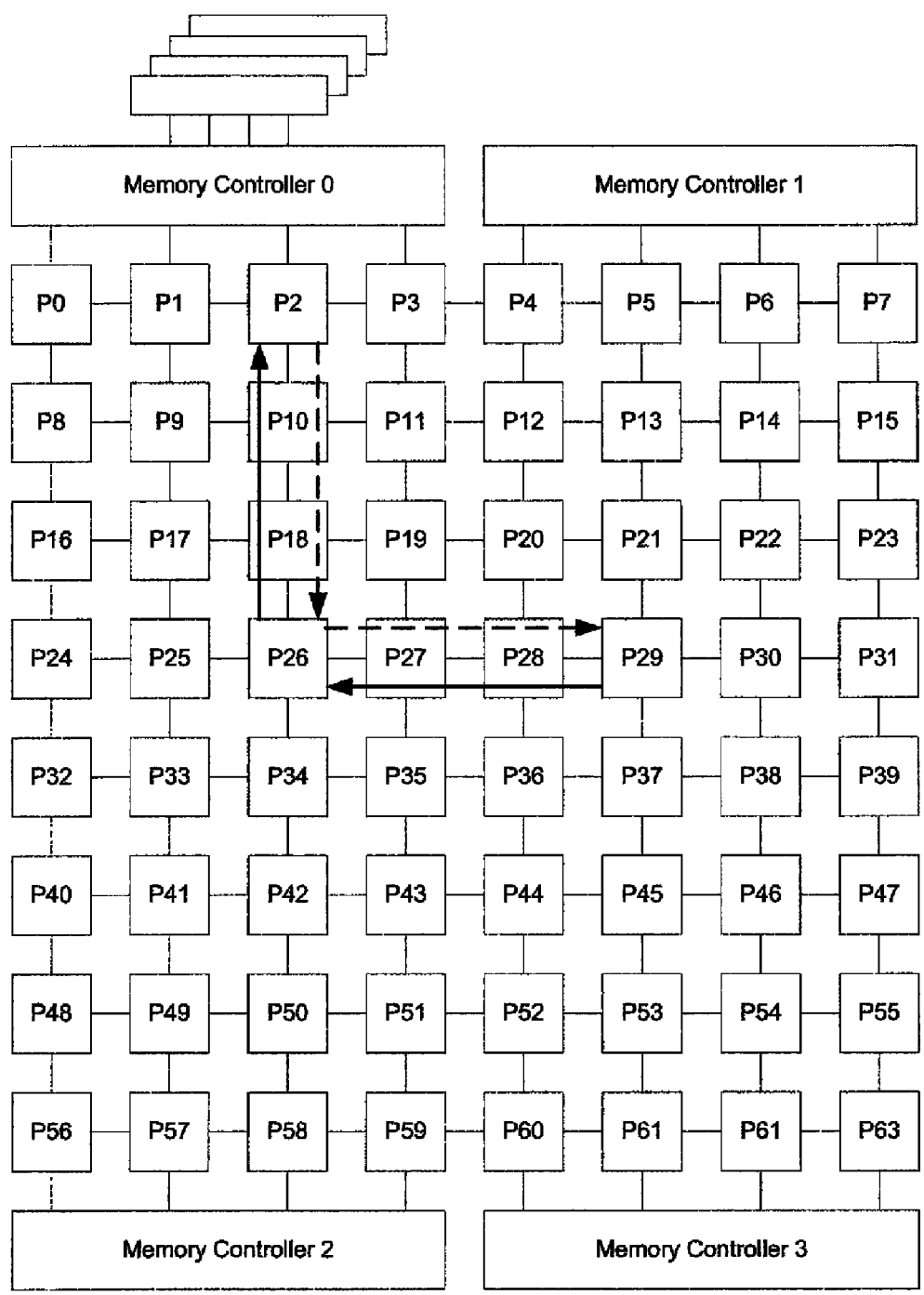
FIG. 4A illustrates a routing implementation in accordance with aspects of the invention.

In accordance with one aspect of the invention, class-based deterministic routing ("CDR") employs message routing between the processors and the memory controllers based on message type. In particular, memory request packets employ "XY" routing while memory reply packets employ "YX" routing. FIG. 4A illustrates the exemplary architecture 100 of FIG. 1 using the CDR architecture. In this example, data packets are routed between external memory 108 associated with memory controller "0" and processor P29. Memory request packets from the processor P29 are routed as shown with the solid arrows. Memory reply packets from the external memory 108 associated with memory controller "0" are routed as shown with the dashed arrows.

Thus, a memory request packet sent from processor P29 to external memory via memory controller 0 may be routed through the nodes in the −X direction and then through the nodes in the +Y direction. As shown, such memory request packets pass through the nodes containing processors P28, P27 and P26 in the −X direction and through P18, P10 and P2 in the +Y direction. The memory reply packets from the external memory are sent from memory controller 0 in the −Y direction and then in the +X direction. Thus, these packets pass through the nodes containing processors P2, P10, P18 and P26 in the −Y direction, and through P27 and P28 in the +X direction before arriving at the node for processor P29.

The edge of the mesh may be handled the same way. For instance, requests from P24 to P31 travel in the +X direction as there are no Y dimension components, and the reply(ies) from P31 to P24 travel in the −X direction as there are no Y dimension components. This scenario is a good example of why a torus (e.g., an architecture with edge symmetric topology) may be a good architecture choice, because P24 and P31 would only be 1 hop away (around the wraparound link of the torus).

The logic for performing such routing may reside in the router switches, such as in processing logic or firmware 116. The routing logic is desirably integral to every router/switch in the tile. Each router determines the output port using either a lookup table or combinational logic. A lookup table provides flexibility and handles faults gracefully by easily re-routing packets. The "routing algorithm" is desirably implemented by programming the collective set of routing tables.

In one example, a lookup table is used to implement a flexible, programmable routing function. It is indexed by a virtual channel and destination identifier fields found in the header of each packet. In the example, each packet comprises one or more flow control units ("flits"), which are the basic unit for managing buffer space in the input buffers of the router switches. Request and reply packet classes have separate virtual channel buffers to ensure protocol deadlock-freedom.

Figure 4B:
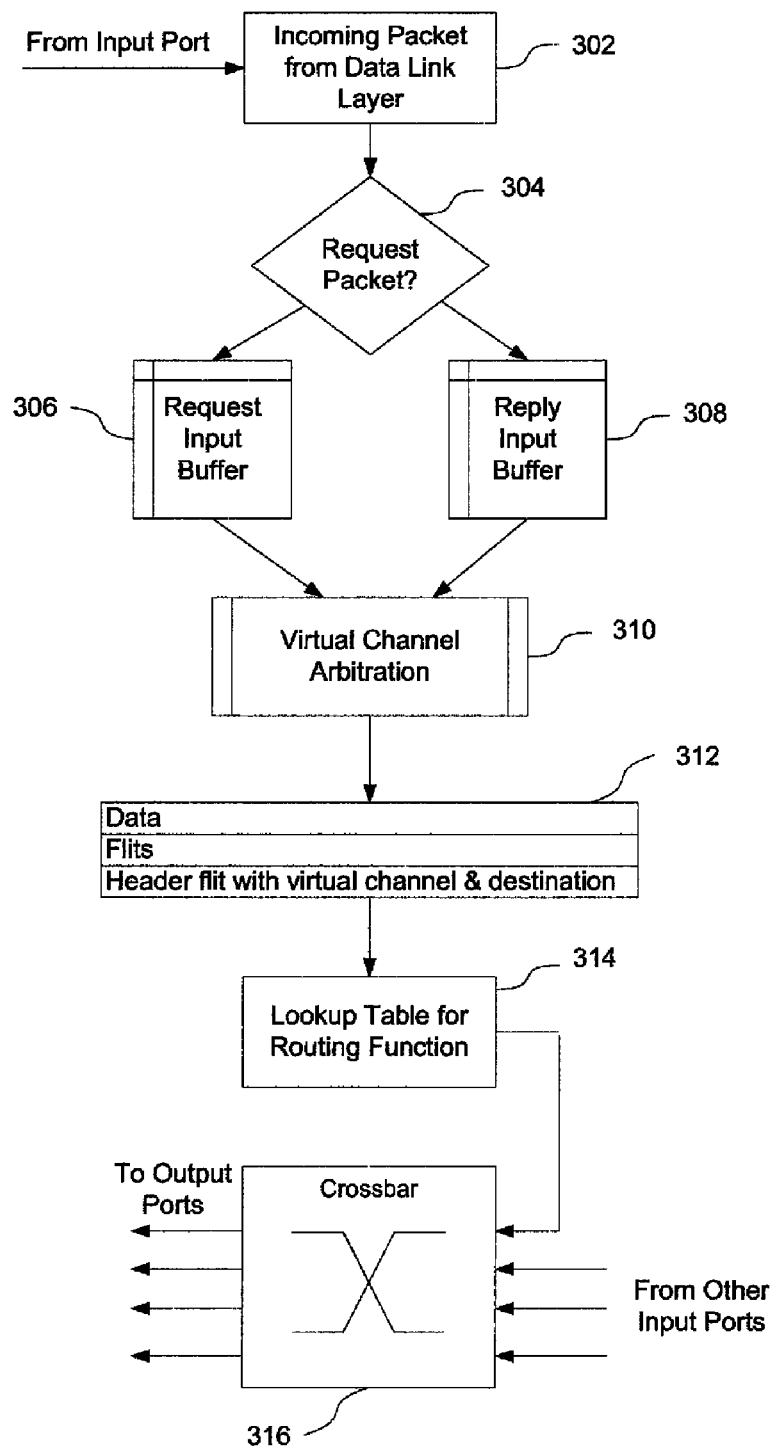
FIG. 4B is a flow diagram illustrating aspects of the invention in accordance with FIG. 4A.

FIG. 4B provides a flow diagram 300 illustrating one embodiment of such a routing function. As shown in block 302, incoming packets from a data link layer are received via an input port of a router. The incoming packets are checked for data integrity in the data-link layer prior to being enqueued on the appropriate input buffer.

At block 304, the type of packet (e.g., request or reply) is evaluated. The virtual channel indicates what "class" the packet is used for. For instance, class 0 may be used for request packets, and class 1 may be used for reply packets. A 64 node on-chip network, for example, may employ a 128 entry lookup table. Here, entries 0 . . . 63 may be used for routing request packets, and entries 64 . . . 127 may be used for routing reply packets. As shown, if an incoming packet is a request packet, it is stored in a request input buffer per block 306, and if it is a reply packet, it is stored in a reply input buffer per block 308. As shown at block 310, virtual channel arbitration is conducted for the packets temporarily stored in the request and reply input buffers. Then, as per block 312, the packet that wins arbitration flows to the route lookup table for routing.

The value programmed in the lookup table ("LUT") and index (i) determines the output port, as shown in block 314. Two examples of this are shown in FIGS. 4C and 4D.

Thus, for a request as shown in FIG. 4C, at index 29, LUT[29]=−X, indicating that the request packet(s) initiated from that input port be routed along the −X direction. At index 26, LUT[26]=+Y, indicating that received request packets be routed along the +Y direction. And at index 2, LUT[2]=+Y, indicates that request packets from that input port should exit the router on the +Y output port, and enter the memory controller.

FIG. 4D illustrates routing of reply packets according to another lookup example. Here, index 66, LUT[66]=−Y, would route incoming reply packets from that input port (from the memory controller) out the −Y port. At index 90, LUT[90]=+X, would route an incoming reply packet along the +X direction. And at index 92, LUT[92]=+X, which would route the incoming reply packet along the +X direction to a destination node.

The lookup table at each router switch is desirably programmed or otherwise stored in the processing logic/firmware of the router switch prior to injecting any traffic in the network. Once programmed or otherwise stored, the lookup table effectively implements the CDR routing process in a way that load-balances request-reply traffic to minimize memory contention and provide low-latency under heavy traffic demand. Once the routing is selected, the packet is then sent via an output port to the appropriate next node in the array.

According to another aspect, the CDR architecture is employed to load-balance the processor-to-memory traffic. In one example, the impact of request and response routing on memory traffic can be estimated by measuring the channel load, because the network throughput is inversely proportional to the worst-case (maximum) channel load.

When both the request and the reply traffic are both considered, static routing procedures such as XY and YX dimension order routing ("DOR") perform similarly. For instance, reply traffic creates a bottleneck for XY routing and request traffic creates a bottleneck for YX routing. In contrast, the CDR system may significantly outperform other routing configurations.

Figure 5:
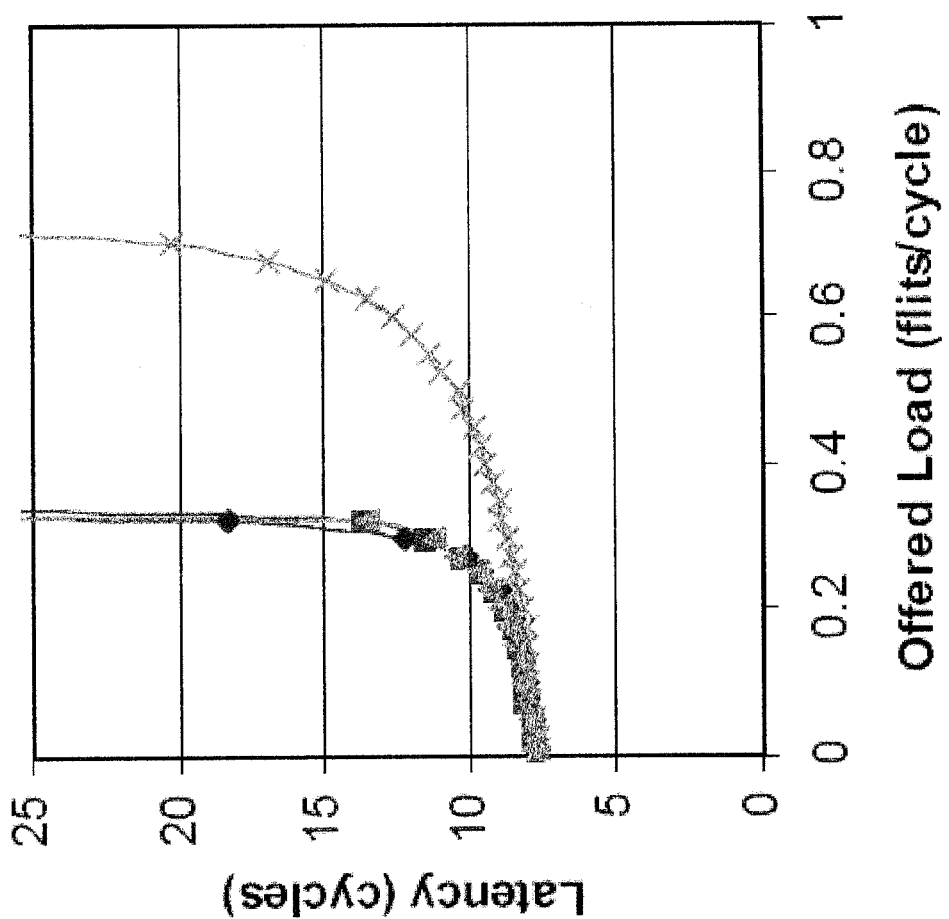
FIG. 5 illustrates a latency versus offered load chart in accordance with aspects of the invention.

FIG. 5 illustrates how CDR compares to XY, XY and XY-YX routing for a mesh architecture. Here, a simulation was performed with the following parameters. 64 processors were configured in an array such as shown in FIG. 1. In the scenario of FIG. 5, 16 memory controllers were positioned with eight connected to the top row of processors and eight connected to the bottom row of processors. Router latency was cycle, and the inter-router wire latency was 1 cycle. Router buffering was 32 flits per input divided among the virtual controllers. The flits are flow control digits which form the packets that are routed. The packet size was 1 flit for a request and four flits for a reply. Two virtual channels were simulated for XY and YX DOR as well as CDR. Four virtual channels were simulated for XY-YX routing.

FIG. 5 plots offered load (flits per cycle) versus latency (number of cycles). For this mesh and memory controller arrangement, CDR provided a nearly 100% increase in throughput over XY and YX DOR as well as XY-YX routing (at the asymptote, approximately 0.7 flits per cycle for CDR as compared to approximately 0.35 flits per cycle for the other routing techniques).

While both CDR and XY-YX routing take advantage of path diversity as some packets are routed XY and others are routed YX, CDR significantly outperformed XY-YX routing for the above simulated scenario. Unlike XY-YX routing, CDR takes advantage of the characteristics of memory traffic (where approximately ½ the traffic will be requests and the remaining approximate ½ is reply traffic) and the load-balanced traffic pattern. For instance, the CDR deterministic routing is based on the message type and load-balances all of channels to provide high throughput while adding randomization.

Figure 6B:
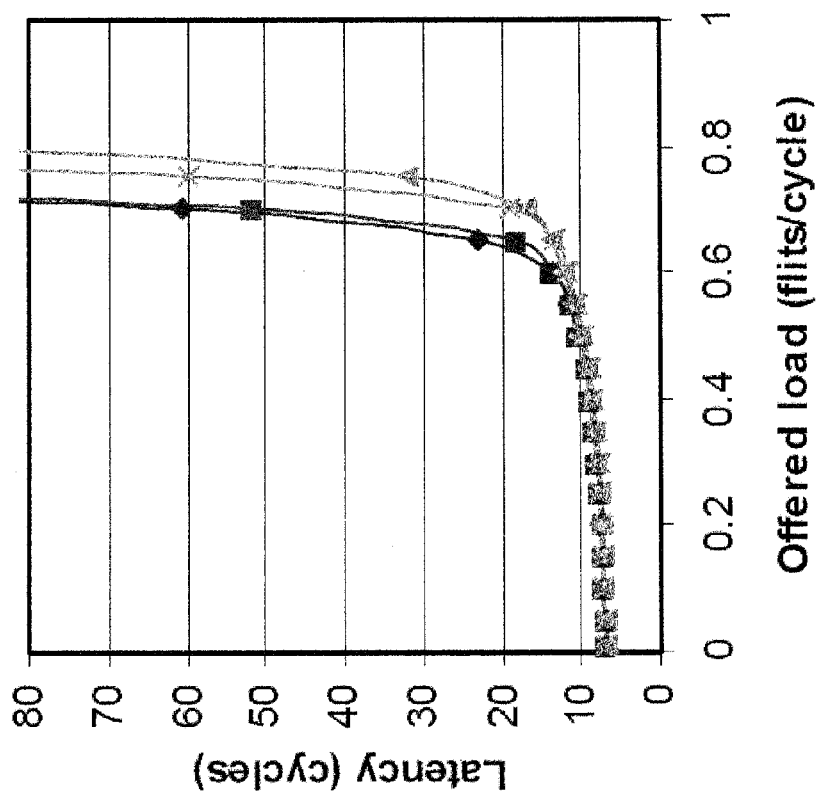
FIGS. 6A-B illustrate a multiprocessor and controller architecture and a latency versus offered load chart in accordance with aspects of the invention.
Figure 6A:
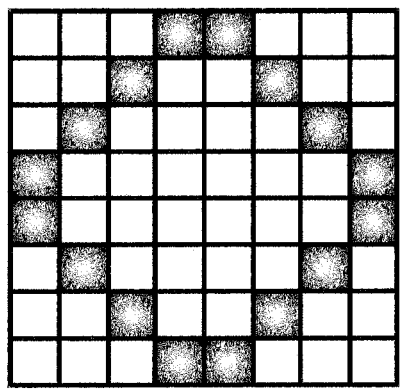

Other system configurations may result in different results. For instance, FIG. 6A illustrates an 8×8 mesh array having the memory controllers positioned in a diamond-type arrangement. In FIG. 6B, a latency versus offered load simulation is provided. As shown, the results for XY, YX, XY-YX and CDR are similar.

The impact of routing algorithms has also been simulated with closed-loop evaluation using a batch experiment to model the memory coherence traffic of a shared memory multiprocessor. In this scenario, each processor executed a fixed number of remote memory operations (N) (e.g., requests to the memory controller) during the simulation and the time required for all operations to complete was measured. Each processor was allowed to have r outstanding requests before the processor needed to halt the injection of packets into the network and wait until replies were received from the memory controller. An on-chip network using values of 4 and 16 for r and 1000 for N were employed. Simulations showed that a larger N did not change the trend in the comparisons.

Figure 7A:
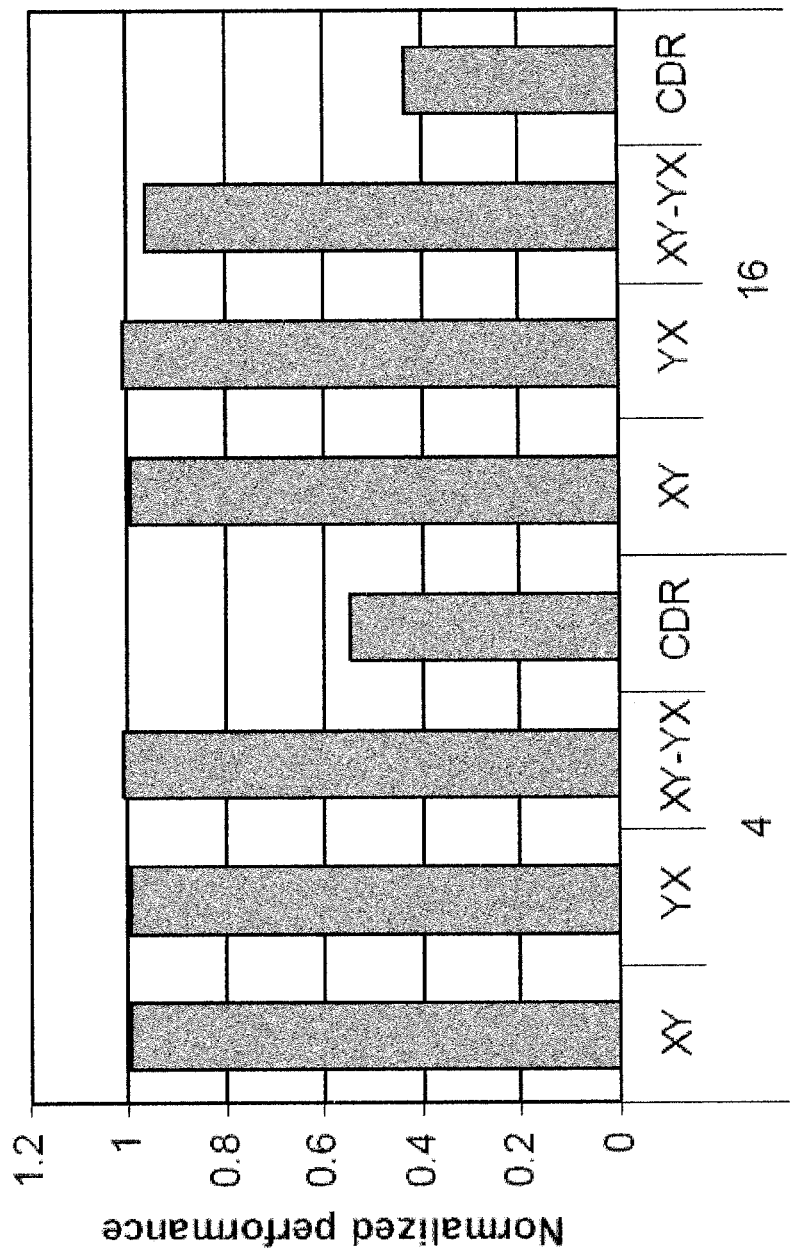
FIGS. 7A-B illustrate normalized performance plots in accordance with aspects of the invention.

For the simulation architecture described above having a mesh of 64 processors with memory controllers along the top and bottom portions of the array, CDR routing significantly outperformed the XY, YX and XY-YX techniques, as shown in FIG. 7A. With CDR routing, it can be seen that the limitations of the placement are overcome resulting in significant improvements as CDR balanced the load to reduce the execution time by up to 45% with r=4 and up to 56% with r=16. With higher r, the network becomes more congested and thus, proper load-balancing through the use of CDR routing enables significant performance advantage.

Figure 7B:
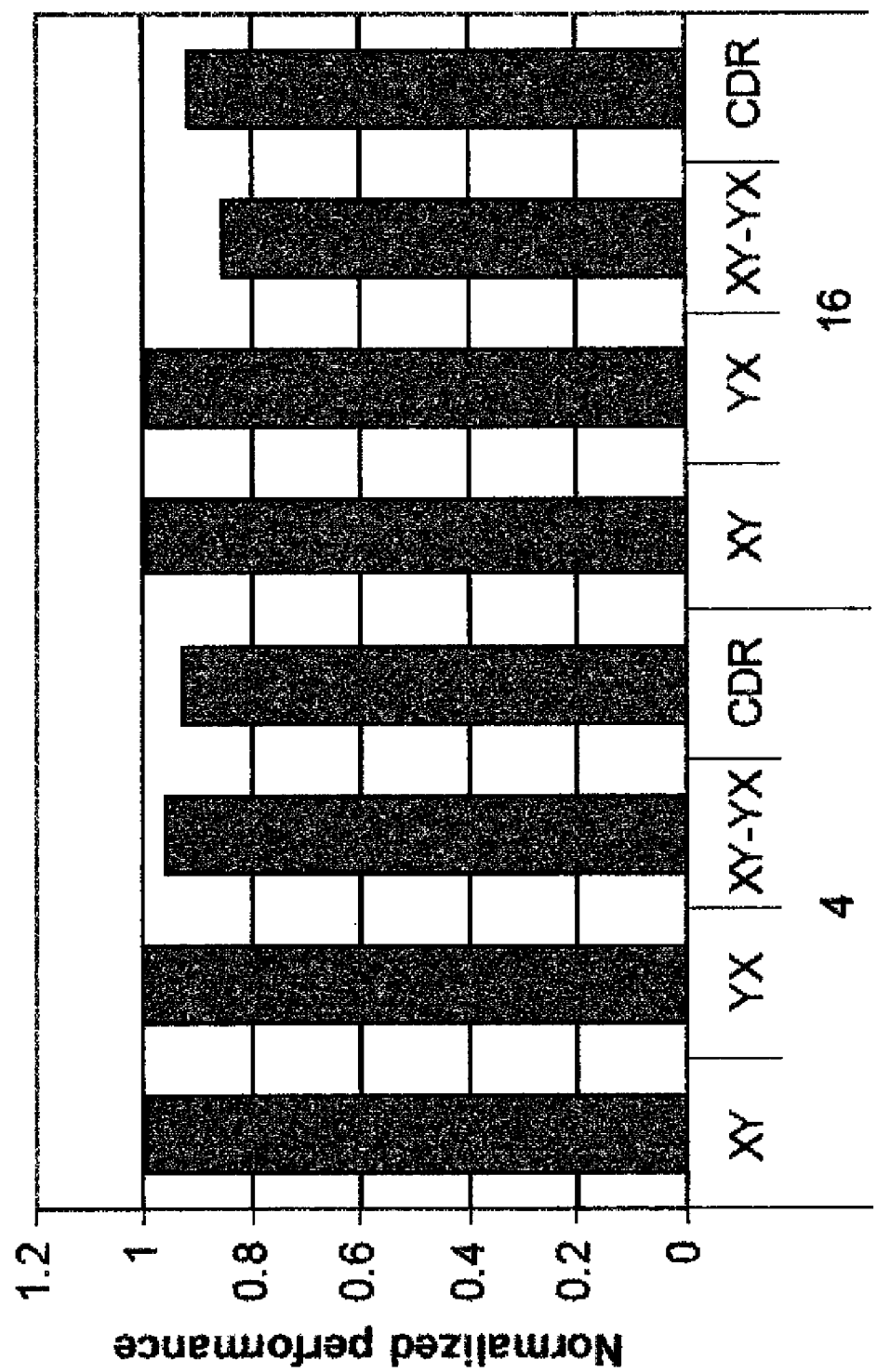

FIG. 7B illustrates simulation results for the diamond-type architecture shown in FIG. 6A. With the diamond placement and a uniform random traffic, the benefit of CDR provided up to a 9% improvement in performance.

For the batch simulations, a distribution of completion time was plotted for processor. With the mesh of 64 processors with memory controllers along the top and bottom portions of the array, the use of CDR provided not only higher performance in terms of lower completion time but also resulted in a much tighter distribution of completion, which lead to a tighter variance, as shown in FIGS. 8A-9D. In the diamond configuration, balancing the load through CDR also resulted in a tighter distribution when compared to XY and YX DOR, as shown in FIGS. 9A-D.

The processes and operations set forth herein may be implemented directly by one or more hardware-based processors such as sub-processing units in a multiprocessor array. Alternatively, the processes and operations may be stored in a computer-readable recording medium such as flash memory, a CD-ROM, a hard drive and the like. In the latter case, the information may be stored in electronic format as a program for execution by the processor(s).

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A multiprocessor architecture employing deterministic packet routing, the architecture comprising:
   a plurality of processors arranged in an array, each processor residing at a node of the array and operable to route message packets across the array;
   a plurality of memory controllers, each memory controller being directly connected to at least one of the plurality of processors and to external memory;
   a plurality of router switches, each router switch being coupled to one of the nodes in the array, each router switch being connected to the processor of that node, and operable to direct the message packets to an adjacent node in the array in a class-based deterministic packet routing process;
   wherein each router switch evaluates a received message packet to determine if it is a memory request packet or a memory reply packet, if the received message packet is a memory request packet issued from a source processor of the plurality of processors to a destination memory controller of the plurality of memory controllers, then the received memory packet is passed through selected nodes from the source processor to the destination memory controller via XY or YX routing, where X and Y are the routing directions from the selected nodes of the array, and if the received message packet is a memory reply packet issued from a source memory controller of the plurality of memory controllers to a destination processor of the plurality of processors, then the received memory packet is passed through the selected nodes from the source memory controller to the destination processor via YX or XY routing, so that if the memory request packet is passed through the selected nodes via XY routing then the memory reply packet is passed through the selected nodes via YX routing, and if the memory request packet is passed through the selected nodes via YX routing then the memory reply packet is passed through the selected nodes via XY routing.

2. The multiprocessor architecture of claim 1, wherein the array comprises a mesh architecture.

3. The multiprocessor architecture of claim 1, wherein each router switch is a multi-port router switch having ports coupled to the adjacent nodes in the array and a port coupled to the processor residing at the same node in the array.

4. The multiport processor architecture of claim 3, wherein each multi-port router switch includes buffering for storing the received memory packet, a routing mechanism for routing the received memory packet, and processing logic for determining which path to route the received memory packet along.

5. The multiport processor architecture of claim 4, wherein the routing mechanism includes at least one pair of shared physical channels into and out of the multi-port router switch and a set of independent request and response virtual channels multiplexed between the at least one pair of shared physical channels to avoid deadlock.

6. The multiport processor architecture of claim 1, wherein each router switch includes a preset routing table for determining an output routing direction for the received memory packet.

7. The multiport processor architecture of claim 6, wherein the preset routing table includes at least a first entry for the memory request packet and at least a second entry for the memory reply packet, wherein the second entry is distinct from the first entry.

8. A method of performing deterministic packet routing in a multiprocessor architecture, the method comprising:
obtaining one or more message packets at a node in a multiprocessor array;
determining whether each message packet is a memory request packet or a memory reply packet;
storing each memory request packet in a request input buffer and storing each memory reply packet in a reply input buffer;
arbitrating between the stored memory request packets and memory reply packets to determine which virtual channel will be used to transmit selected packets to adjacent nodes in the multiprocessor array;
analyzing a first one of the selected packets using preset routing information to determine which adjacent node in the multiprocessor array the first selected packet will be sent to; and
transmitting the first selected packet to the determined adjacent node in the multiprocessor array;
wherein the first selected packet is transmitted via XY or YX routing according to its packet type so that if the first selected packet is a memory request packet it is passed via XY routing and if the first selected packet is a memory reply packet it is passed from the node to a given one of the adjacent nodes via YX routing, where X and Y are the routing directions from nodes in the multiprocessor array.

9. The method of claim 8, wherein analyzing the first selecting packet includes evaluating a route lookup table to determine the adjacent node.

10. The method of claim 9, wherein the route lookup table stores a first routing layout for memory request packets and a second routing layout for memory reply packets, the second layout being distinct from the first layout.

11. The method of claim 10, wherein in a first scenario the first layout is an XY routing scheme and the second layout is a YX routing scheme, and in a second scenario the first layout is the YX routing scheme and the second layout is the XY routing scheme.

12. A method of performing deterministic packet routing in a multiprocessor architecture, the method comprising:
obtaining one or more message packets at a node in a multiprocessor array;
determining whether each message packet is a memory request packet or a memory reply packet;
storing each memory request packet in a request input buffer and storing each memory reply packet in a reply input buffer;
arbitrating between the stored memory request packets and memory reply packets to determine which virtual channel will be used to transmit selected packets to adjacent nodes in the multiprocessor array;
analyzing a first one of the selected packets using preset routing information to determine which adjacent node in the multiprocessor array the first selected packet will be sent to; and
transmitting the first selected packet to the determined adjacent node in the multiprocessor array;
wherein the first selected packet is transmitted via XY or YX routing according to its packet type so that if the first selected packet is a memory request packet it is passed via YX routing and if the first selected packet is a memory reply packet it is passed from the node to a given one of the adjacent nodes via XY routing, where X and Y are the routing directions from node in the multiprocessor array.

13. A tangible, non-transitory computer-readable recording medium recorded with a program executable by a processor, the program causing the processor to perform deterministic packet routing in a multiprocessor architecture, the processor being configured to execute the program to:
obtain one or more message packets at a node in a multiprocessor array;
determine whether each message packet is a memory request packet or a memory reply packet;
store each memory request packet in a request input buffer and store each memory reply packet in a reply input buffer;
arbitrate between the stored memory request packets and memory reply packets to determine which virtual channel will be used to transmit selected packets to adjacent nodes in the multiprocessor array;
analyze a first one of the selected packets using preset routing information to determine which adjacent node in the multiprocessor array the first selected packet will be sent to;
transmit the first selected packet to the determined adjacent node in the multiprocessor array; and configure a routing mechanism having at least one pair of shared physical channels and a set of independent request and response virtual channels multiplexed between the at least one pair of shared physical channels to avoid deadlock.

14. The computer-readable recording medium of claim 13, further comprising causing the processor to execute operations associated with the first selected packet.

15. A tangible, non-transitory computer-readable recording medium recorded with a program executable by a processor, the program causing the processor to perform deterministic packet routing in a multiprocessor architecture, the processor being configured to execute the program to:

obtain one or more message packets at a node in a multiprocessor array;

determine whether each message packet is a memory request packet or a memory reply packet;

store each memory request packet in a request input buffer and store each memory reply packet in a reply input buffer;

arbitrate between the stored memory request packets and memory reply packets to determine which virtual channel will be used to transmit selected packets to adjacent nodes in the multiprocessor array;

analyze a first one of the selected packets using preset routing information to determine which adjacent node in the multiprocessor array the first selected packet will be sent to; and transmit the first selected packet to the determined adjacent node in the multiprocessor array;

wherein the first selected packet is transmitted via XY or YX routing according to its packet type so that if the first selected packet is a memory request packet it is passed via XY routing and if the first selected packet is a memory reply packet it is passed from the node to a given one of the adjacent nodes via YX routing, where X and Y are the routing directions from nodes in the multiprocessor array.

16. A tangible, non-transitory computer-readable recording medium recorded with a program executable by a processor, the program causing the processor to perform deterministic packet routing in a multiprocessor architecture, the processor being configured to execute the program to:

obtain one or more message packets at a node in a multiprocessor array;

determine whether each message packet is a memory request packet or a memory reply packet;

store each memory request packet in a request input buffer and store each memory reply packet in a reply input buffer;

arbitrate between the stored memory request packets and memory reply packets to determine which virtual channel will be used to transmit selected packets to adjacent nodes in the multiprocessor array;

analyze a first one of the selected packets using preset routing information to determine which adjacent node in the multiprocessor array the first selected packet will be sent to; and transmit the first selected packet to the determined adjacent node in the multiprocessor array;

wherein the first selected packet is transmitted via XY or YX routing according to its packet type so that if the first selected packet is a memory request packet it is passed via YX routing and if the first selected packet is a memory reply packet it is passed from the node to a given one of the adjacent nodes via XY routing, where X and Y are the routing directions from node in the multiprocessor array.

* * * * *